G. H. RANSOM.
ADJUSTABLE PIVOT BEARING.
APPLICATION FILED DEC. 29, 1919.

1,393,965.

Patented Oct. 18, 1921.

Inventor-
George Hardiman Ransom.
By B. Singer. Atty.

UNITED STATES PATENT OFFICE.

GEORGE HARDIMAN RANSOM, OF NORTHFIELD, BIRMINGHAM, ENGLAND.

ADJUSTABLE PIVOT-BEARING.

1,393,965.  Specification of Letters Patent.  Patented Oct. 18, 1921.

Application filed December 29, 1919. Serial No. 348,165.

*To all whom it may concern:*

Be it known that I, GEORGE HARDIMAN RANSOM, a subject of the King of Great Britain, and a resident of Northfield, Birmingham, in the county of Warwick, England, have invented certain new and useful Improvements in Adjustable Pivot-Bearings, of which the following is a specification.

This invention relates to improvements in worm and wheel fittings such as are employed for adjusting the inclination of wind screens for motor vehicles.

The invention comprises improvements in worm and wheel gear of the kind wherein the adjustment of the thread of the worm relatively to the teeth of the wheel is effected by tilting or inclining the axle of the worm relatively to the worm wheel in the plane of the said wheel, and consists in providing improved means for effecting such tilting of the worm axle relatively to the worm wheel.

In a known construction of such gear the worm spindle is provided at its inner end with an axial ball bearing and also with adjustable means for moving the said spindle about such axial bearing in the plane of the wheel, and the present invention consists in providing improved means whereby the said ball bearing at the inner end of the worm spindle can be adjusted vertically in the plane of the worm wheel passing through the axis of the worm, and also for preventing the lateral jamming of the worm wheel teeth against the worm due to any deflection of the worm wheel shaft while being rotated or to the worm wheel not being quite accurately mounted on the said shaft. The carrying out of this invention is preferably effected by forming the seat of the said ball bearing in a slide adapted to be moved along a fixed support, as for example the inner wall of the gear casing, by means of a conical or wedge like member provided with means for forcing its conical or inclined portion into contact with the end edge of the said slide in such a manner as to move it in the plane of the worm wheel and thereby enable the desired adjustment to be effected, and also to allow of a slight lateral or rocking movement of the said slide by any slight departure of the worm wheel from its place of rotation. This action can be effective only within certain limits and as an additional means of preventing such departure of the worm wheel from its plane of rotation the worm wheel is formed rigidly or integrally with the central portion of a rod of which the two portions at each side of the wheel are arranged to fit tightly into the ends of two tubes forming the shaft of the worm and the hinge shaft of the screen.

Figure 1:
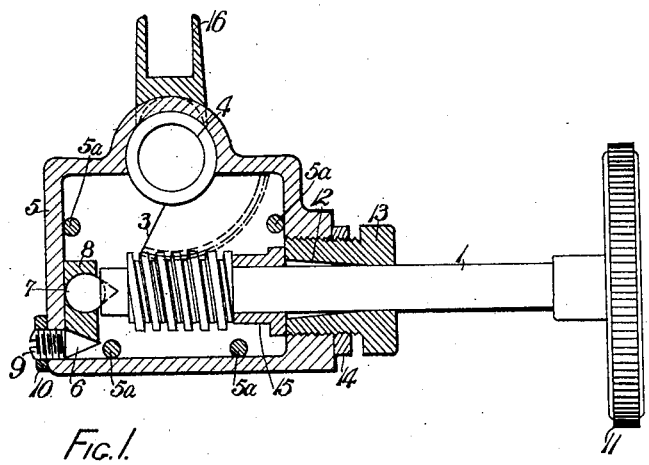
Figure 2:
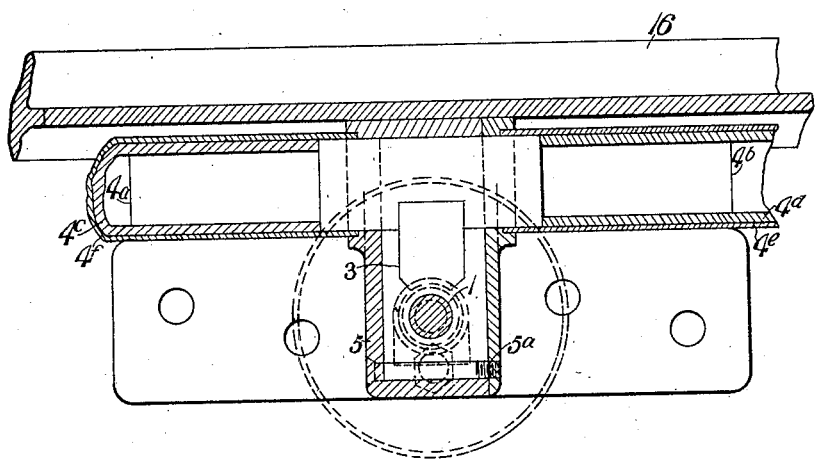

An example of the invention is illustrated in Figures 1 and 2 of the accompanying drawings, Fig. 1 being a sectional side view and Fig. 2 a partly sectional front view of the said gear. In these drawings 5 is a casing in which is mounted in suitable bearings a worm shaft 1, and a worm wheel sector 3 formed on a portion of the shaft 4. The end of the worm shaft is provided with a conical recess adapted to receive a ball 7. This ball is seated in a recess in a slide 8 adapted to slide on the inner wall of the casing 5, and provided on its lower edge with a conical recess adapted to be engaged by the conical end 6 of a set screw 9 provided with a lock nut 10.

The worm wheel is reduced to a sector of sufficient size to admit of the desired inclination of the wind screen, the top of the casing 5 being shaped to permit of the maximum movement of such sector. This sector 3 is formed integrally with two rod portions 4ª and 4ᵇ adapted to fit tightly and be secured in the tubes 4ᶜ and 4ᵈ, thereby forming the tilting hinge rod of the screen. These rods are provided with an outer casing 4ᵉ and 4ᶠ. The lower member of the screen framing is shown at 16.

It will be readily understood that by means of the set screw 9 the ball bearing seat or slide 8 can be moved so as to adjust the worm thread relatively to the teeth of the worm wheel, and that as the slide 8 is free to move on the point 6 as a pivot it will accommodate any lateral movement of the worm due to any deflection of the worm wheel shaft or from slight inaccuracies in the mounting of the worm wheel on the said shaft, and thereby prevent any lateral jamming of the worm wheel on the worm.

The outer end of the worm spindle is provided with an operating hand wheel 11, and any suitable means may be provided such as an internally conical bore 12 formed in the worm shaft bearing gland nut 13 for enabling the tilting or inclining of the worm axle to be effected, the said gland nut being screwed into the casing 5 and provided with a lock nut 14. Longitudinal movement of the worm shaft 1 with respect of the casing is prevented by means of a gland 15.

The invention is also applicable to worm axle tilting gear having an axial ball bearing at the inner end of the worm axle, wherein the ball of the bearing is formed integrally with the end of the spindle, and adapted to bear in a suitable recess formed in the slide 8.

What I claim and desire to secure by Letters Patent is:—

An adjustable pivot bearing for supporting one end of a worm comprising a slide carrying the pivot bearing for the worm, an inclined lower face on said slide and a wedge coacting with said inclined face consisting of a screw having a conical end which engages the inclined face of the wedge whereby longitudinal movement of the screw effects adjustment of the slide and consequent variation in the degree of engagement of said worm with its worm wheel.

Dated this 3rd day of December, 1919.

In witness whereof I affix my signature.

GEORGE HARDIMAN RANSOM.